(12) United States Patent
Sigamani

(10) Patent No.: US 8,488,350 B2
(45) Date of Patent: Jul. 16, 2013

(54) DC-AC INVERTERS

(75) Inventor: James Sigamani, Quezon (PH)

(73) Assignee: Astec International Limited, Kwun Tong, Kowloon (HK)

(*) Notice: Subject to any disclaimer, the term of this patent is extended or adjusted under 35 U.S.C. 154(b) by 701 days.

(21) Appl. No.: 12/567,219

(22) Filed: Sep. 25, 2009

(65) Prior Publication Data

US 2011/0075455 A1 Mar. 31, 2011

(51) Int. Cl.
*H02M 7/00* (2006.01)
*H02M 3/335* (2006.01)

(52) U.S. Cl.
USPC ............................................. 363/71; 363/132

(58) Field of Classification Search
USPC ............................ 363/95, 97, 98, 71, 131–134
See application file for complete search history.

(56) References Cited

U.S. PATENT DOCUMENTS

| | | | |
|---|---|---|---|
| 5,657,219 A | 8/1997 | Stanley | |
| 6,483,730 B2 * | 11/2002 | Johnson, Jr. | 363/123 |
| 6,545,887 B2 * | 4/2003 | Smedley et al. | 363/89 |
| 6,728,119 B2 * | 4/2004 | Reilly et al. | 363/37 |
| 7,333,349 B2 | 2/2008 | Chang et al. | |
| 7,706,163 B2 * | 4/2010 | Tan et al. | 363/132 |
| 7,782,032 B2 * | 8/2010 | Taufik et al. | 323/272 |
| 7,872,887 B2 * | 1/2011 | Nishio et al. | 363/97 |
| 2010/0254170 A1 * | 10/2010 | Wu et al. | 363/40 |

OTHER PUBLICATIONS

"Dual-Buck Full-Bridge Inverter With Hysteresis Current Control", Z. Yao, L. Xiao, Y. Yan; Aug. 2009; pp. 3153-3160.
"A Novel Single-Stage Full-Bridge Buck-Boost Inverter," Chien-Ming Wang; 2003 IEEE; 7 pgs.
"A Novel Switch-mode DC-to-AC Inverter With Non-linear Robust Control," Zaohong Yang and P.C. Sen; 1997 IEEE; 7 pgs.

* cited by examiner

*Primary Examiner* — Jessica Han
(74) *Attorney, Agent, or Firm* — Harness, Dickey & Pierce, P.L.C.

(57) ABSTRACT

A method of operating a DC-AC inverter to produce AC power having alternating positive and negative half cycles is disclosed. The inverter includes an input connected to a DC power source, an output, a first buck converter coupled between the input and the output and a second buck converter coupled between the input and output. The method includes alternately operating the first buck converter and the second buck converter to alternately produce the positive and negative half cycles at the output.

28 Claims, 13 Drawing Sheets

US 8,488,350 B2

DC-AC INVERTERS

FIELD

The present disclosure relates to DC-AC inverters.

BACKGROUND

This section provides background information related to the present disclosure which is not necessarily prior art.

Some power converters convert direct current (DC) to alternating current (AC). Such DC-AC converters are often referred to as inverters. Inverters have many industrial and commercial uses including, for example, converting DC power from a battery or photovoltaic source into AC power for a load. Inverters may also be used to supply AC power to an electric utility grid.

FIGS. 1 through 6 illustrate several known inverters. FIG. 1 illustrates an inverter including a half bridge topology using symmetrical bipolar switching. FIG. 2 illustrates a known inverter employing a full bridge converter with symmetrical uni-polar switching. FIG. 3 illustrates another known inverter including a full bridge converter using asymmetrical uni-polar switching. FIG. 4 shows another known inverter including a full bridge converter powered by a buck converter front end. Another known inverter including a modified version of a buck converter is illustrated in FIG. 5. A three level half bridge inverter is shown in FIG. 6.

SUMMARY

This section provides a general summary of the disclosure, and is not a comprehensive disclosure of its full scope or all of its features.

According to one aspect of the present disclosure, a method of operating a DC-AC inverter to produce AC power having alternating positive and negative half cycles is disclosed. The inverter has an input connected to a DC power source, an output, a first buck converter coupled between the input and the output and a second buck converter coupled between the input and output. The method includes alternately operating the first buck converter and the second buck converter to alternately produce the positive and negative half cycles at the output.

According to another aspect of this disclosure, a DC-AC inverter for converting a DC power input to an AC power output includes an input for connection to a DC power source and an output including a first output terminal and a second output terminal. A first buck converter is coupled between the input and the output and a second buck converter is coupled between the input and the output. The inverter also includes a controller for alternately operating the first buck converter and the second buck converter to produce AC power at the output.

According to yet another aspect of the present disclosure, a DC-AC inverter includes an input for connection to a DC power source and an output including a first output terminal and a second output terminal. The inverter further includes a first power switch having a first terminal and a second terminal and a second power switch having a first terminal and second terminal. The inverter also includes a first inductor having a first terminal and a second terminal and a second inductor having a first terminal and a second terminal. The inverter further includes a first grounding switch and a second grounding switch. The first terminal of the first power switch and the first terminal of the second power switch are coupled to the input. The second terminal of the first power switch is coupled to the first terminal of the first inductor. The second terminal of the second power switch is coupled to the first terminal of the second inductor. The second terminal of the first inductor is coupled to the first output terminal. The second terminal of the second inductor is coupled to the second output terminal. The first grounding switch is coupled between the first output terminal and a reference voltage and the second grounding switch is coupled between the second output terminal and the reference voltage.

Further areas of applicability will become apparent from the description provided herein. It should be understood that various aspects of this disclosure may be implemented individually or in combination with one or more other aspects. It should also be understood that the description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 13 is an equivalent circuit diagram for the circuit of FIG. 12 when a power switch is on.

Corresponding reference numerals indicate corresponding parts throughout the several views of the drawings.

DETAILED DESCRIPTION

Figure 1:
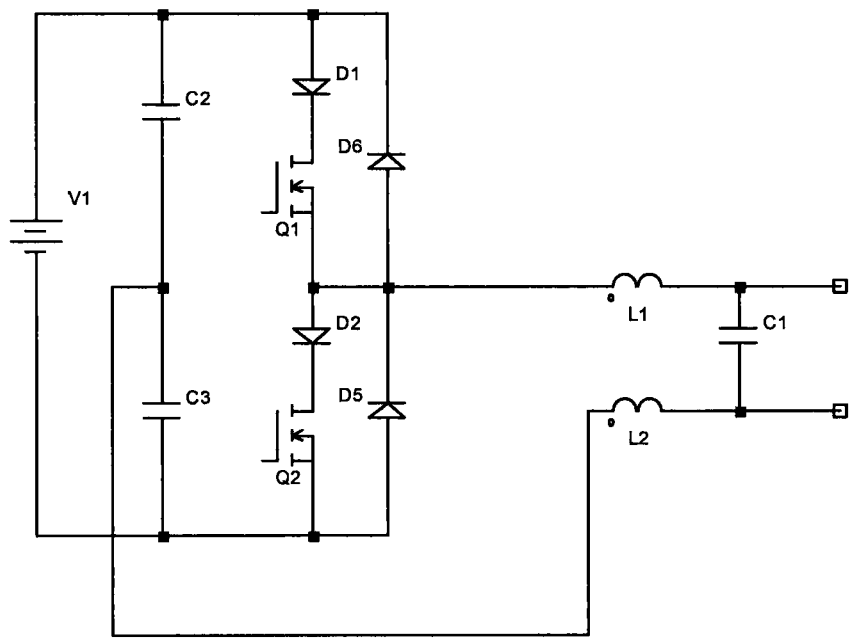
FIGS. 1-6 are circuit diagrams illustrating various inverter designs according to the prior art.
Figure 2:
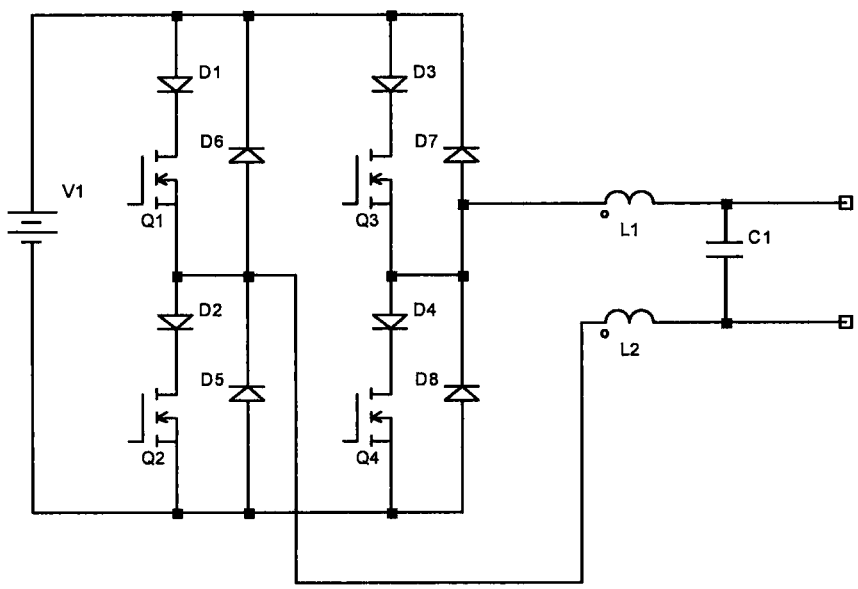
Figure 3:
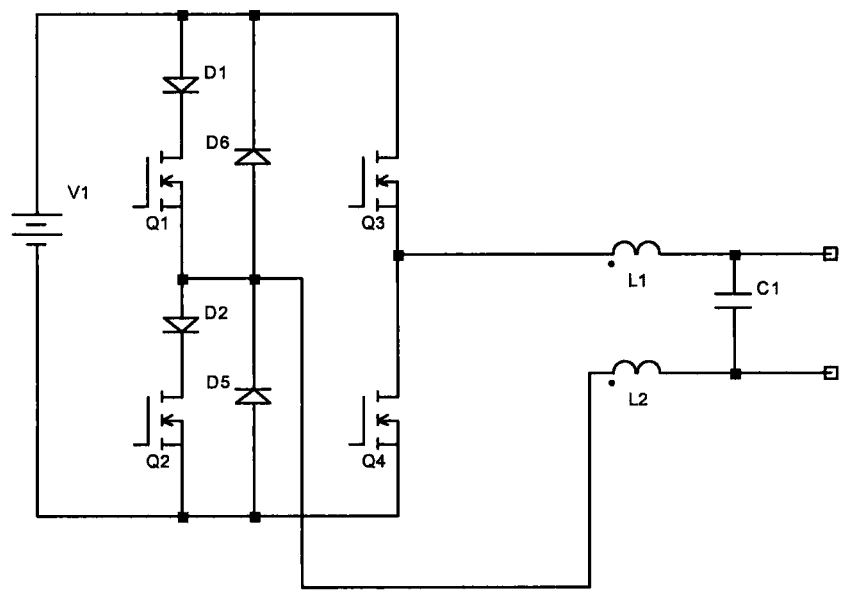
Figure 4:
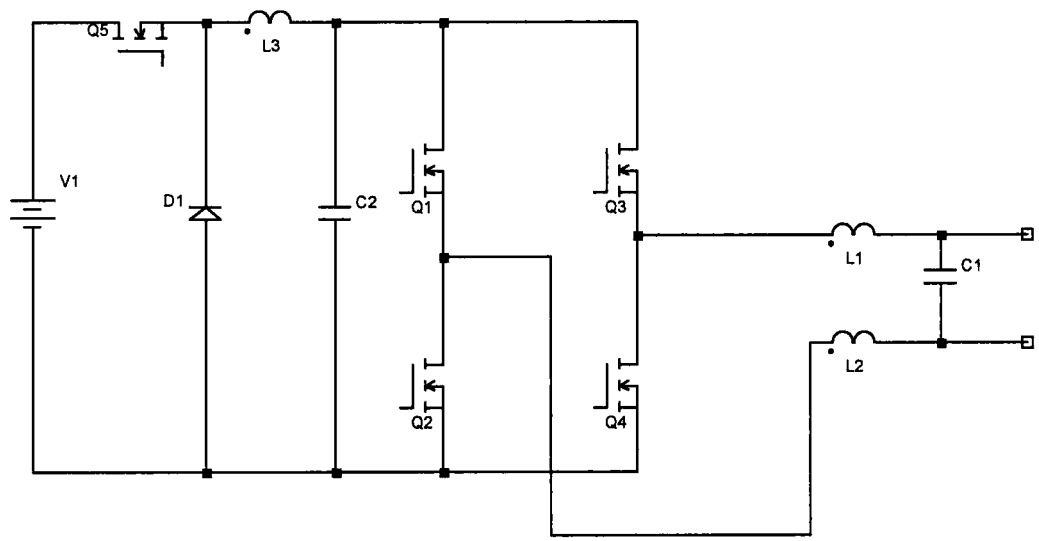
Figure 5:
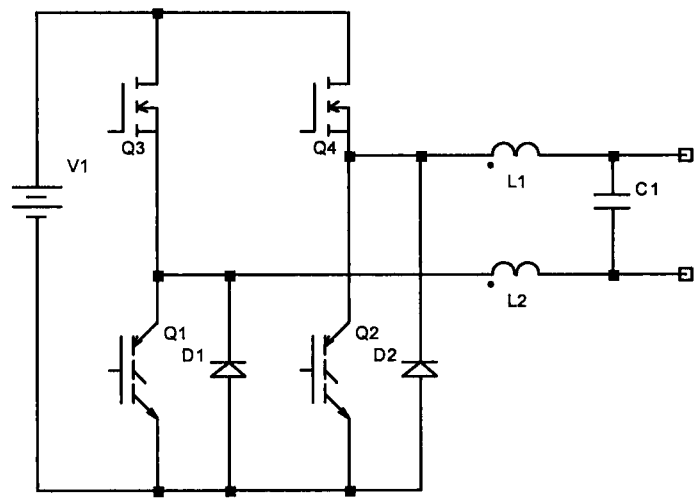
Figure 6:
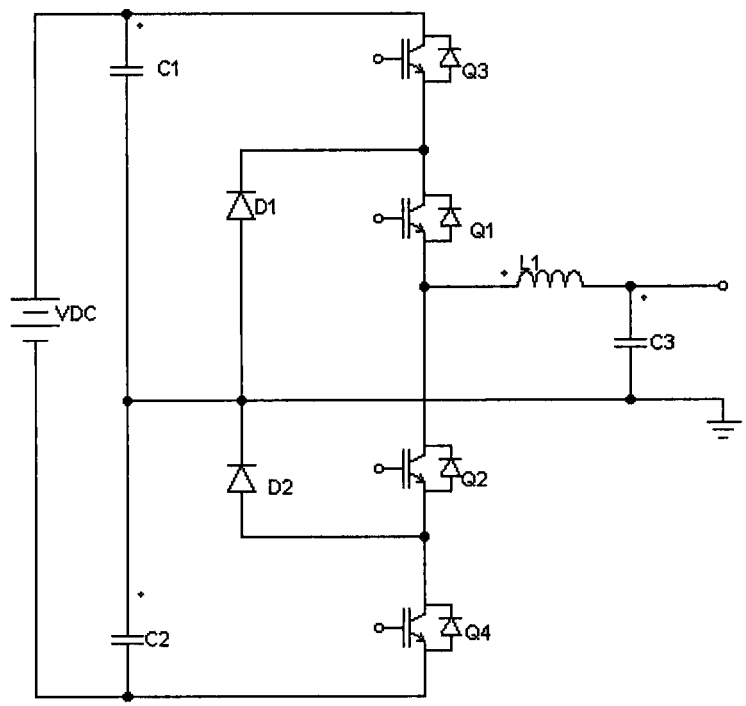

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

According to one aspect of the present disclosure, a method of operating a DC-AC inverter to produce AC power having alternating positive and negative half cycles is disclosed. The inverter has an input connected to a DC power source, an output, a first buck converter coupled between the input and the output and a second buck converter coupled between the input and output. The method includes alternately operating the first buck converter and the second buck converter to alternately produce the positive and negative half cycles at the output.

Alternately operating the first buck converter and the second buck converter may include not operating the first buck converter when the second buck converter is operating. Similarly, it may include not operating the second buck converter when the first buck converter is operating.

The inverter output may include first and second output terminals with the first buck converter connected to the first output terminal and the second buck converter connected to the second output terminal. In this manner, if each buck converter is operable to produce positive current through its associated inductor, then a load coupled across the first and second output terminals will see alternating positive and negative half cycles (i.e., AC power) at the inverter output.

The input of the inverter may be coupled to any suitable DC power supply including, for example, a battery, a photovoltaic source, a power converter supplying DC power, etc. The output of the inverter may be coupled to any device or system requiring AC power.

The first and second buck converters may be controlled using any suitable control techniques including, for example, average current mode control techniques, voltage mode sinusoidal PWM (SPWM) control, etc.

If the first and second buck converters are connected to the first and second output terminals, respectively, the method may further include connecting the first output terminal to a reference voltage when the second buck converter is operating, and connecting the second output terminal to the reference voltage when the first buck converter is operating. In this manner, the output terminal that is coupled to the non-operating buck converter may be connected to a reference voltage.

The inverter may further include grounding switches coupled between the output terminals and the reference voltage for alternately connecting the first and second output terminals to the reference voltage.

The reference voltage may be any suitable reference voltage including, for example, the negative terminal (DC−) of the DC power source, the positive terminal (DC+) of the DC power source a system ground, an earth ground, a floating ground, etc.

In one example application of the method described above, the output of the DC/AC inverter may be connected to an electric utility grid for supplying AC power to the utility grid. For these grid-tied applications, if the output terminals are alternately connected to the reference voltage, the electric utility grid terminals will, likewise, be alternately connected to the reference voltage. This can reduce electromagnetic interference (EMI) in certain applications, including some applications where the inverter input is coupled to a photovoltaic source.

Additionally, if the inverter includes grounding switches, the buck converters include power switches, and the inverter output is tied to an electric utility grid, the method may further include switching the grounding switches at the line frequency of the electric utility grid, and switching the power switches at a frequency higher than the line frequency.

One example embodiment of a DC-AC inverter capable of performing the method described above will now be described with reference to FIGS. 7-15. It should be understood, however, that the method can be practiced with a wide variety of other inverter designs employing first and second buck converters, and that the method is not limited to the particular example shown in FIG. 7.

Figure 7:
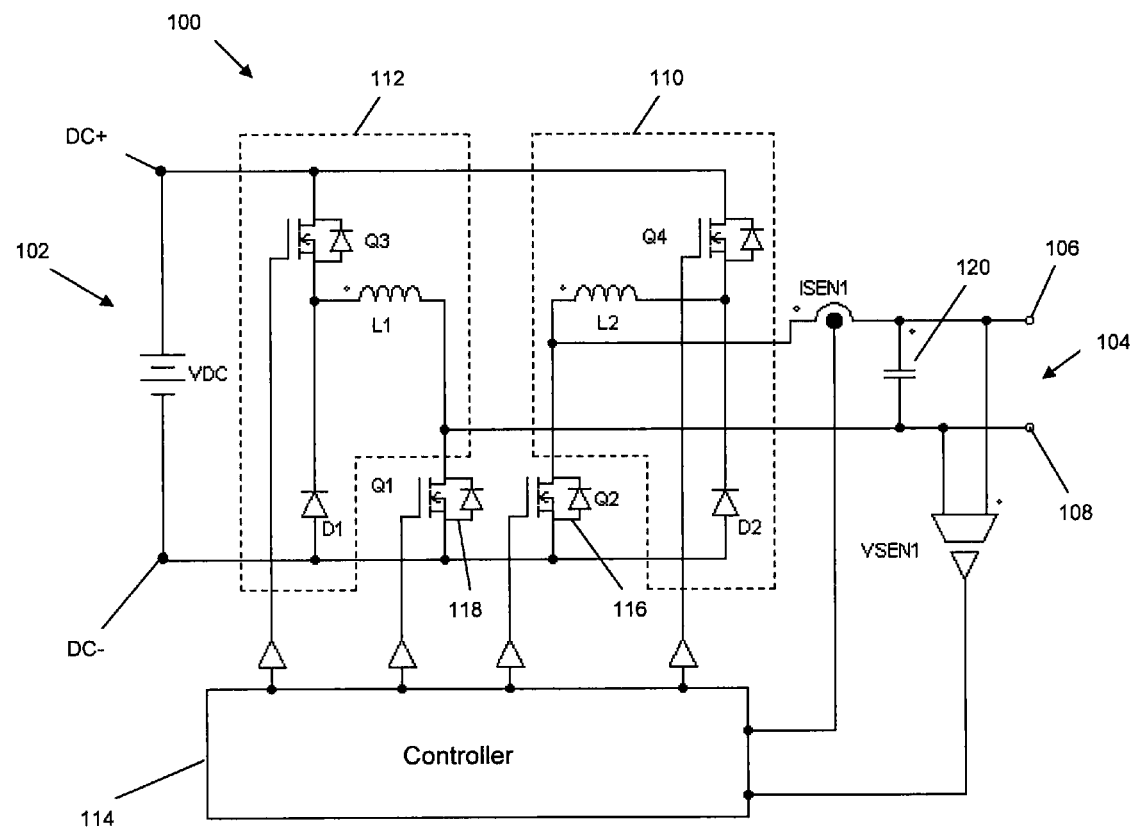
FIG. 7 is a circuit diagram of a DC-AC inverter according to one example embodiment of the present disclosure.

As shown in FIG. 7, the inverter 100 includes an input 102 for connection to a DC power source VDC and an output 104 including a first output terminal 106 and a second output terminal 108. A first buck converter 110 is coupled between the input 102 and the output 104. A second buck converter 112 is also coupled between the input 102 and the output 104. The inverter 100 further includes a controller 114 for alternately operating the first buck converter 110 and the second buck converter 112 to produce AC power at the output 104.

In the specific embodiment shown in FIG. 7, the inverter 100 includes a first grounding switch 116 coupled between the first output terminal 106 and a reference voltage terminal, and a second grounding switch 118 coupled between the second output terminal 108 and the reference voltage terminal. In this example, the reference voltage terminal is the DC− terminal of the input 102. Alternatively, any other suitable reference voltage may be employed including, for example, the DC+ terminal of the input 102, a system ground, an earth ground, a floating ground, etc.

The grounding switches 116, 118 are closed during alternating half cycles to couple their respective output terminals 106, 108 to the reference voltage terminal. For example, when the first buck converter 110 is operating, the second buck converter 112 is not operating and the second switch 118 is closed by the controller 114 to couple the second output terminal 108 to the reference voltage. Similarly, when the second buck converter 112 is operating, the first buck converter 110 is not operating and the first switch 116 is closed by the controller 114 to couple the output terminal 106 to the reference voltage.

In this example embodiment, the inverter 100 includes a voltage sensor VSEN1 to sense the output voltage of the inverter 100 and provide a signal representing the output voltage to the controller 114. The inventor 100 also includes a current sensor ISEN1 to sense an output current of the inverter 100 and provide a signal representing the output current to the controller 114. The voltage sensor VSEN1 and the current sensor ISEN1 may be any type of sensor suitable for measuring voltage and current, respectively. For example, the voltage sensor VSEN1 may be a resistor coupled across the output terminals 106, 108 and appropriate circuitry, the current sensor ISEN1 may be a low resistance resistor in series with one of the output terminals 106, 108, the current sensor ISEN1 may be a Hall sensor, etc.

The controller 114 is configured to alternately operate the first buck converter 110 to produce positive half cycles and the second buck converter 112 to produce negative half cycles. Further, in this example embodiment, the controller 114 is configured to not operate one of the buck converters 110, 112 when the other buck converter 110, 112 is operating. A brief dead time, i.e. a time when neither converter 110, 112 is operating, may exist between operation of the first buck converter 110 and the second buck converter 112. The dead time helps avoid the first and second switches 116, 118 from conducting at the same time. The controller 114 also provides the switching signals to operate the first grounding switch 116 and the second grounding switch 118 to alternately connect the output terminals 106, 108 to the reference voltage.

The controller 114 may be a dedicated controller for the inverter 100, or may also control other circuits, systems (including a load), etc. Examples of suitable controllers include digital signal processors (DSPs), microprocessors, microcontrollers, field programmable gate arrays (FPGAs), and combinations of these devices.

In the example embodiment shown in FIG. 7, the first buck converter 110 includes a power switch Q4, an inductor L2 and a diode D2. Similarly, the second buck converter 112 includes a power switch Q3, an inductor L1 and a diode D1. The first buck converter 110 and the second buck converter 112 share an output capacitor 120 coupled across the output terminals 106, 108.

While the grounding and power switches are illustrated as MOSFETs, it should be understood that other types of switches may be employed including, for example, BJTs, IGBTs, etc.

Figure 8:
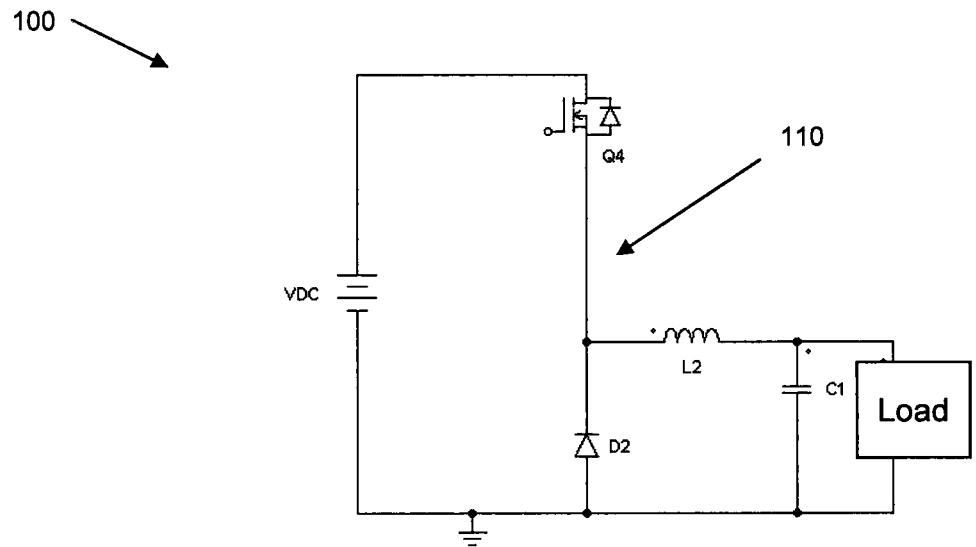
FIG. 8 is an equivalent circuit diagram for the inverter of FIG. 7 during a positive half cycle.
Figure 9:
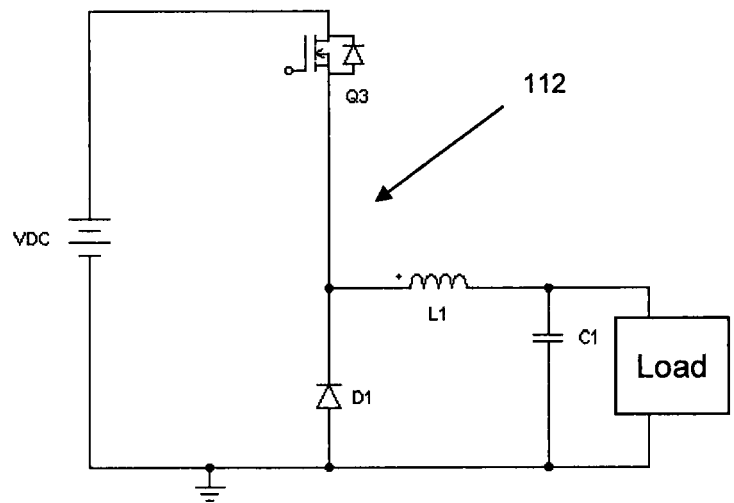
FIG. 9 is an equivalent circuit diagram for the inverter of FIG. 7 during a negative half cycle.

FIG. 8 is an equivalent circuit of the inverter 100 when the inverter 100 is producing a positive half cycle. As can be seen in FIG. 8, the inverter 100 is reduced to the first buck converter 110 when producing a positive half cycle. Similarly, FIG. 9 is an equivalent circuit of the inverter 100 when the inverter 100 is producing a negative half cycle. As can be seen in FIG. 9, the inverter 100 is reduced to the second buck converter 112 when producing a negative half cycle.

To produce positive half cycles, the controller 114 operates the first buck converter 110 using suitable control techniques to produce a generally sinusoidal output current. During this time, the controller 114 also provides a control signal to the second grounding switch 118 that causes the second grounding switch 118 to close. Accordingly, the second output terminal 108 is coupled to the reference voltage when the first buck converter 110 generates a positive half cycle at the output 104. Conversely, to produce negative half cycles, the controller operates the second buck converter 112 using suitable control techniques to produce a generally sinusoidal output current. During this time, the controller 114 also provides a control signal to the first grounding switch 116 that causes the first grounding switch 116 to close. Accordingly, the first output terminal 106 is coupled to the reference voltage when the second buck converter 112 generates a negative half cycle at the output 104. By alternately operating the first and second buck converters, and alternately closing the second and first grounding switches, respectively, alternating positive and negative half cycles (i.e., AC power) is generated at the output 104.

Figure 10:
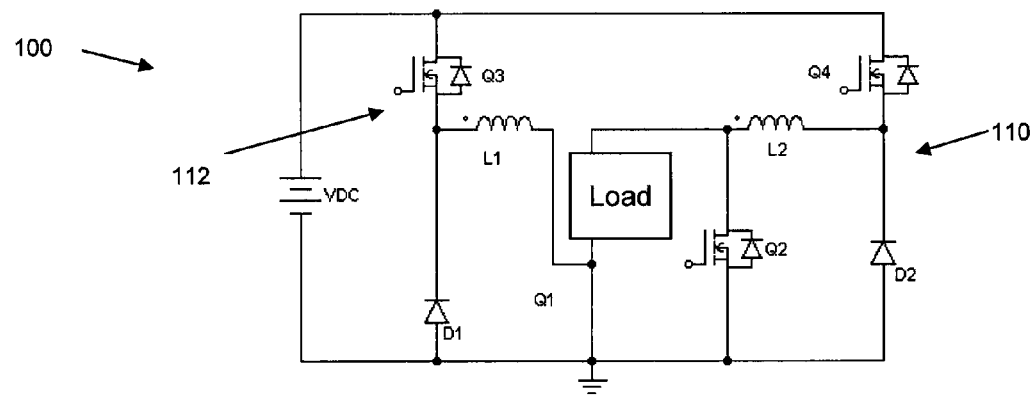
FIG. 10 is a simplified circuit diagram of the inverter of FIG. 7 during a positive half cycle.

Another equivalent circuit is illustrated in FIG. 10 showing the inverter 100 during a positive half cycle. As can be seen in FIG. 10, the grounding switch (Q1) is shorted to the reference voltage.

Figure 11:
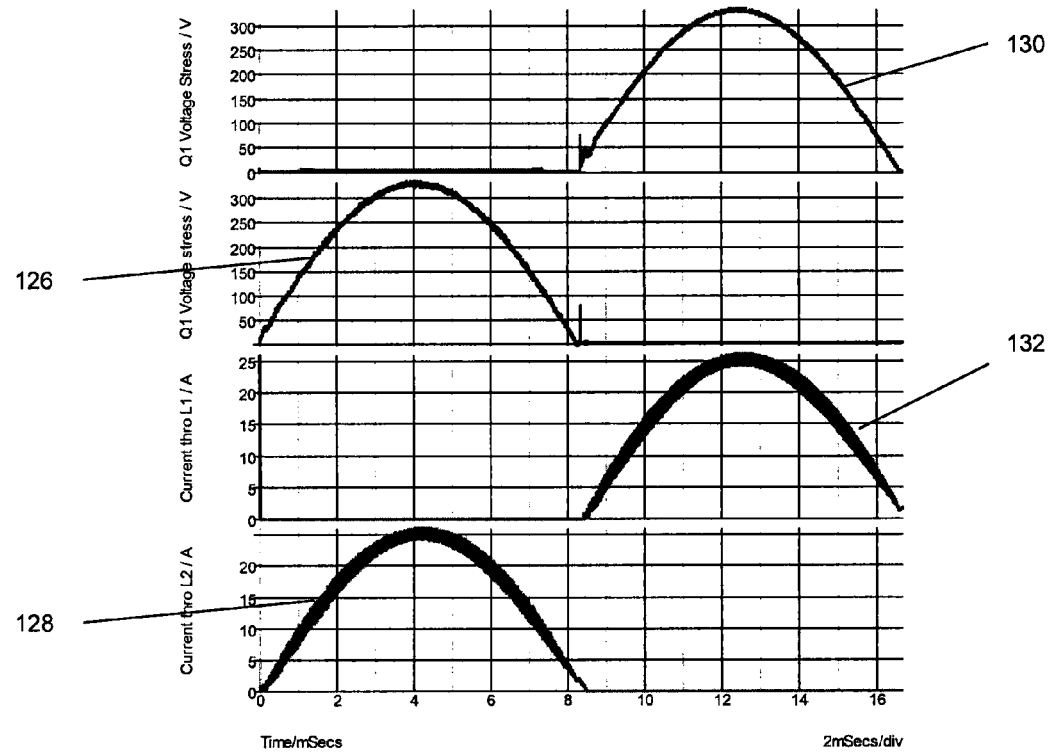
FIG. 11 is a graph of simulated waveforms for the inverter of FIG. 7 coupled to a 400 Volt DC power supply input.

FIG. 11 illustrates simulated waveforms for the inverter 100 during each positive half cycle and each negative half cycle. As shown in FIG. 11, the voltage 130 across the grounding switch (Q1) is approximately zero during the positive half cycle, when the grounding switch (Q1) is closed. At the same time, the voltage 126 across the grounding switch (Q2) rises and falls in a generally sinusoidal manner, and substantially tracks the current 128 through the inductor L2. During the negative half cycle, the voltage 126 across the grounding switch (Q2), which is closed, is approximately zero. At the same time, the voltage across the grounding switch (Q1) rises and falls in a generally sinusoidal manner, and substantially tracks the current 132 through the inductor L1. Because the first buck converter 110 and the buck converter 112 are coupled to different output terminals 106, 108, a load connected across the output terminals 106, 108 will see a substantially sinusoidal output having alternating positive and negative half cycles.

Figure 12:
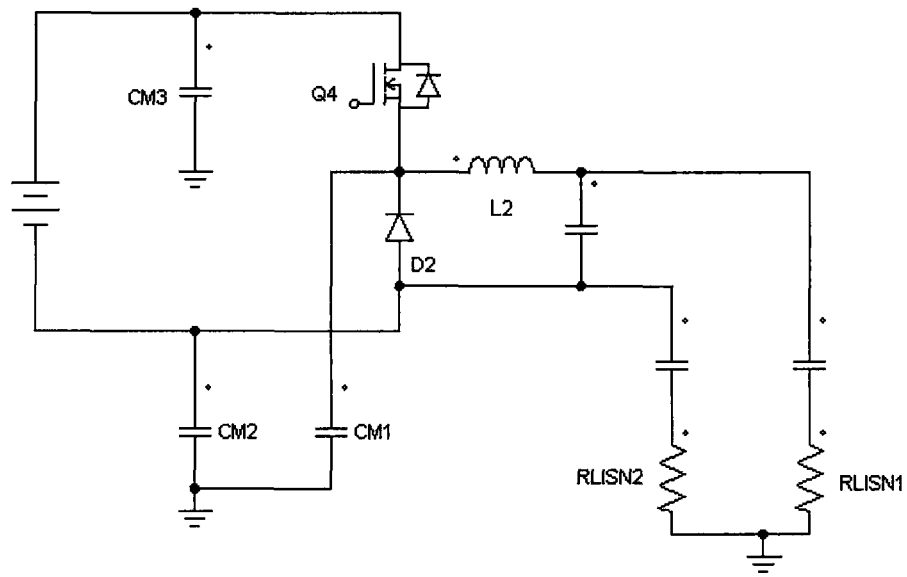
FIG. 12 is an equivalent circuit diagram of the inverter of FIG. 7 illustrating the common mode noise coupling path.
Figure 13:
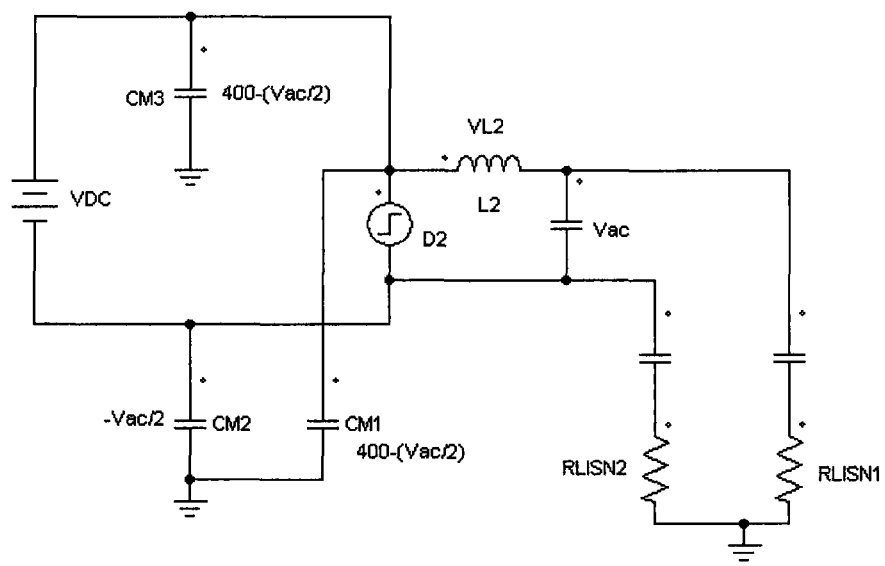
Figure 14:
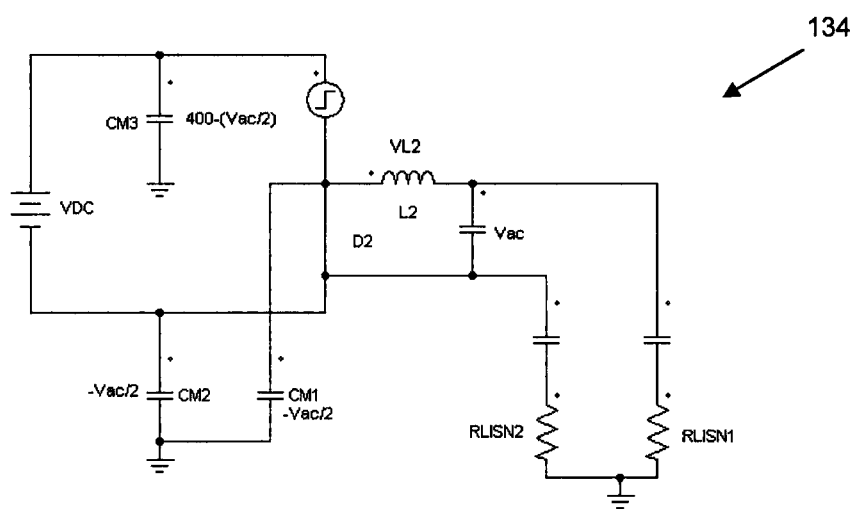
FIG. 14 is an equivalent circuit diagram for the circuit of FIG. 12 during a freewheeling period.

FIG. 12 is another equivalent circuit for the inverter 100 that illustrates the common mode noise-coupling path during each positive half cycle. FIG. 13 is an equivalent circuit for the inverter 100 when the power switch (Q4) of the first buck converter 110 is on. FIG. 14 is an equivalent circuit for the inverter 100 when the power switch (Q4) is off during a positive half cycle (i.e., the freewheeling period during a positive half cycle).

Figure 15:
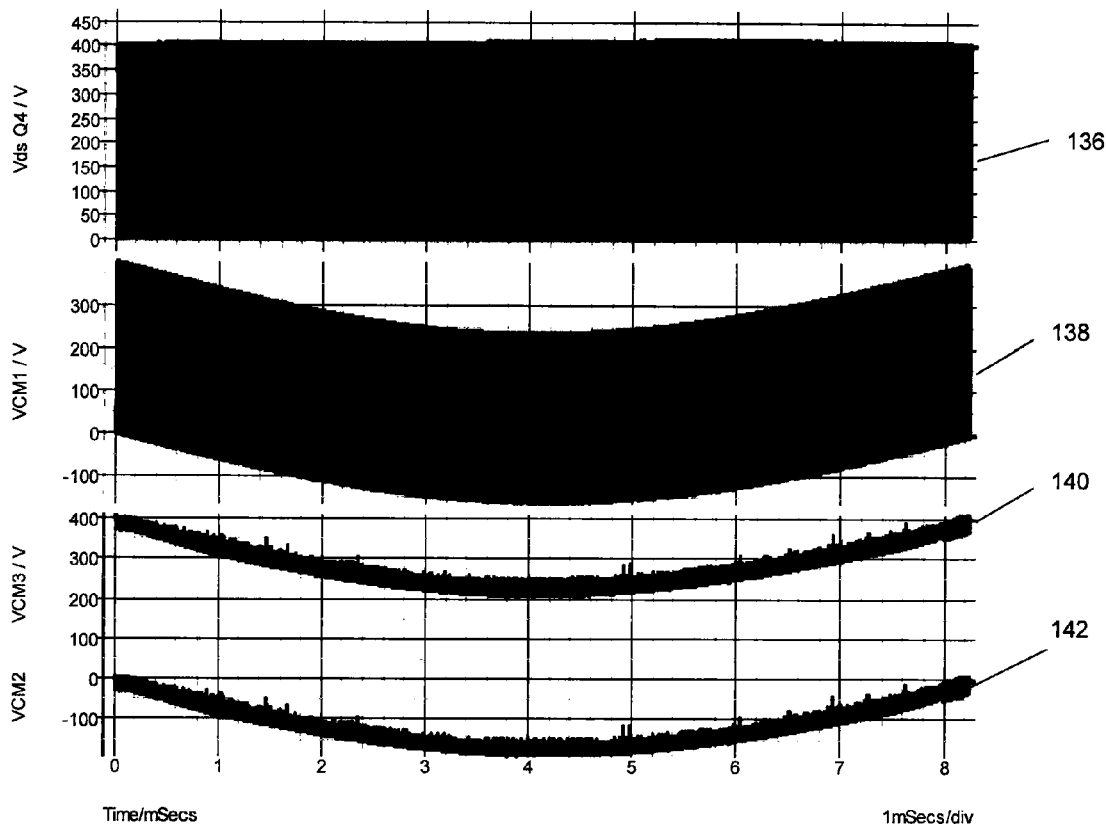
FIG. 15 is a graph of simulated voltage waveforms for the circuit of FIG. 12.
Figure 16:
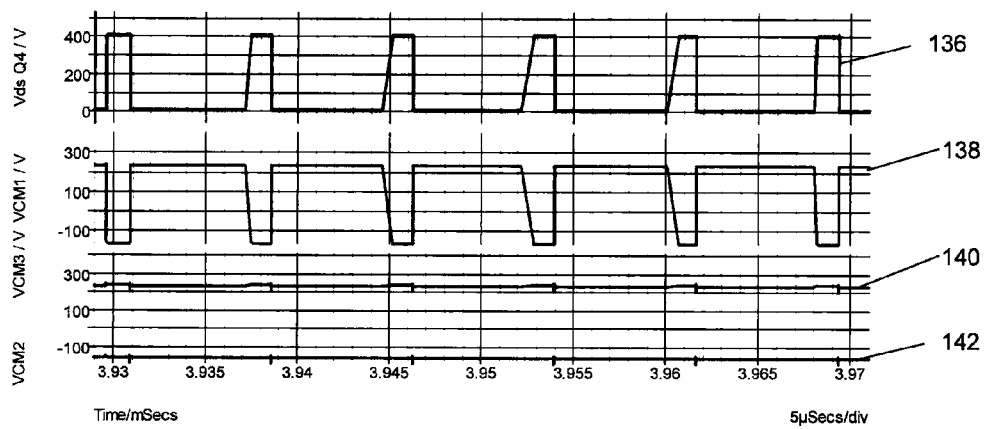
FIG. 16 is a portion of the simulated voltage waveforms of FIG. 15 zoomed to a smaller timescale.

FIGS. 15 and 16 illustrate voltages with respect to earth ground at various nodes of the inverter 100. FIGS. 15 and 16 includes a waveform 136 of the drain to sink voltage (Vds) on power switch Q4. The power switch Q4 will have a Vds of a near zero volts when the power switch Q4 is turned on, i.e., conducting, closed, etc., and a Vds of about the voltage of the DC power source VDC (400 volts in this example) when the power switch Q4 is turned off, i.e., not conducting, open, etc.

A waveform 138 of the voltage between the cathode of diode D2 and earth ground is also illustrated in FIGS. 15 and 16. This voltage, i.e. CM1, will be approximately the voltage of the DC power source VDC minus half of the AC output voltage of the inverter 100 when the power switch Q4 is turned on and about negative one-half the AC output voltage of the inverter 100 when the power switch Q4 is turned off. As illustrated by waveforms 140 and 142 in FIG. 15, the voltages across CM2 and CM3 (in FIGS. 12-14) are low frequency voltages. In particular, the voltages may have the line frequency of an electric utility grid to which the output 104 of the inverter 100 is tied. These lower frequency voltages may result in reduced EMI as compared to high frequency voltages across CM2 and CM3.

Figure 17:
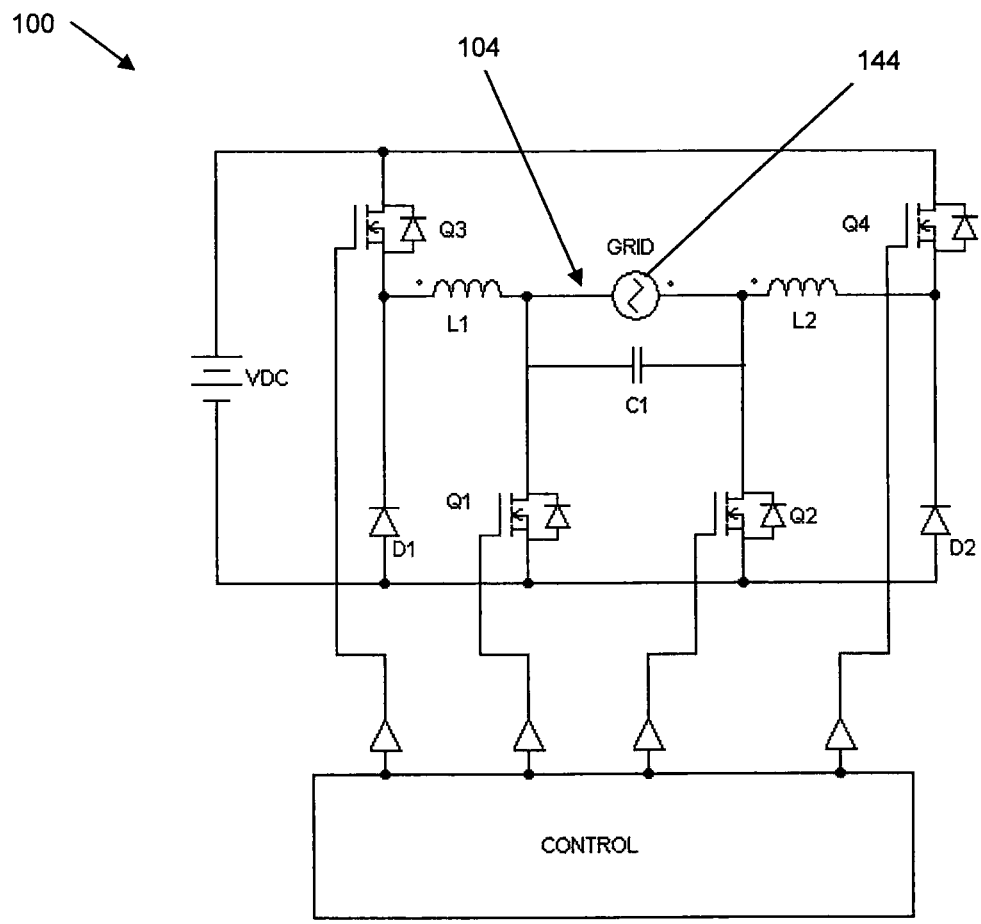
FIG. 17 is a circuit diagram of the inverter of FIG. 7 with its output coupled to an electric utility grid.

FIG. 17 illustrates the inverter 100 connected to an electric utility grid 144. In this example, the gounding switch (Q2) and the grounding switch (Q1) are switched at the line frequency of the grid 144 so that the inverter 100 produces AC power in phase with the grid 144 (which receives AC power from one or more other sources in addition to the inverter 100.

Figure 18:
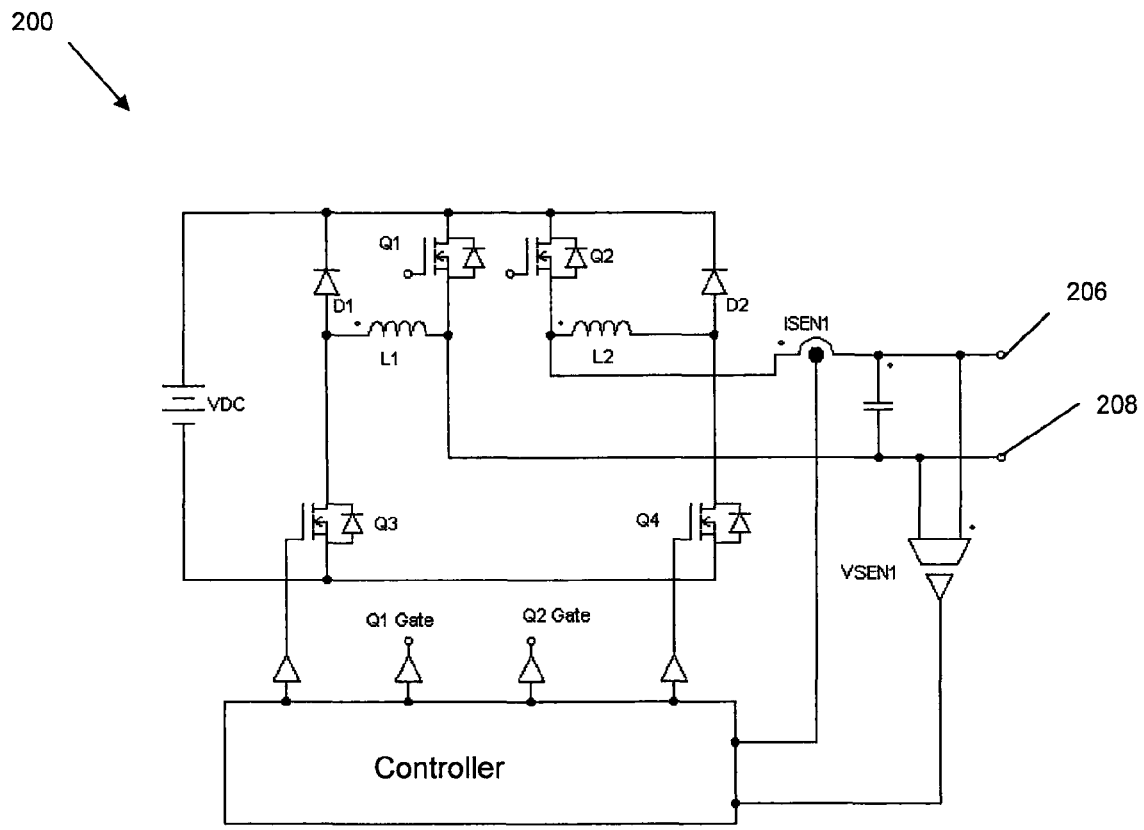
FIG. 18 is a circuit diagram of an example DC-AC inverter according to another example embodiment of the present disclosure.

Another example of a DC-AC inverter 200 capable of performing the method described above is illustrated in FIG. 18. The inverter 200 operates in the same manner as the inverter 100 discussed above. For a positive half cycle, grounding switch Q1 will remain on and power switch Q4, inductor L2 and diode D2 will operate as a buck converter. During a negative half cycle, grounding switch Q2 will be on and power switch Q3, inductor L1 and diode D1 will operate as a buck converter. In the inverter 200, however, the position of the power switches Q3, Q4 are swapped with the diodes D1, D2, respectively, as compared to the inverter 100. When grounding switches Q2, Q1 are alternately turned on, a first output terminal 206 or a second output terminal 208, respectively, is coupled to DC+ (instead of DC− as in the example embodiment of FIG. 7). In such an example embodiment, it may be easier to drive (i.e. control, switch, etc.) the power switches Q3, Q4.

Figure 19:
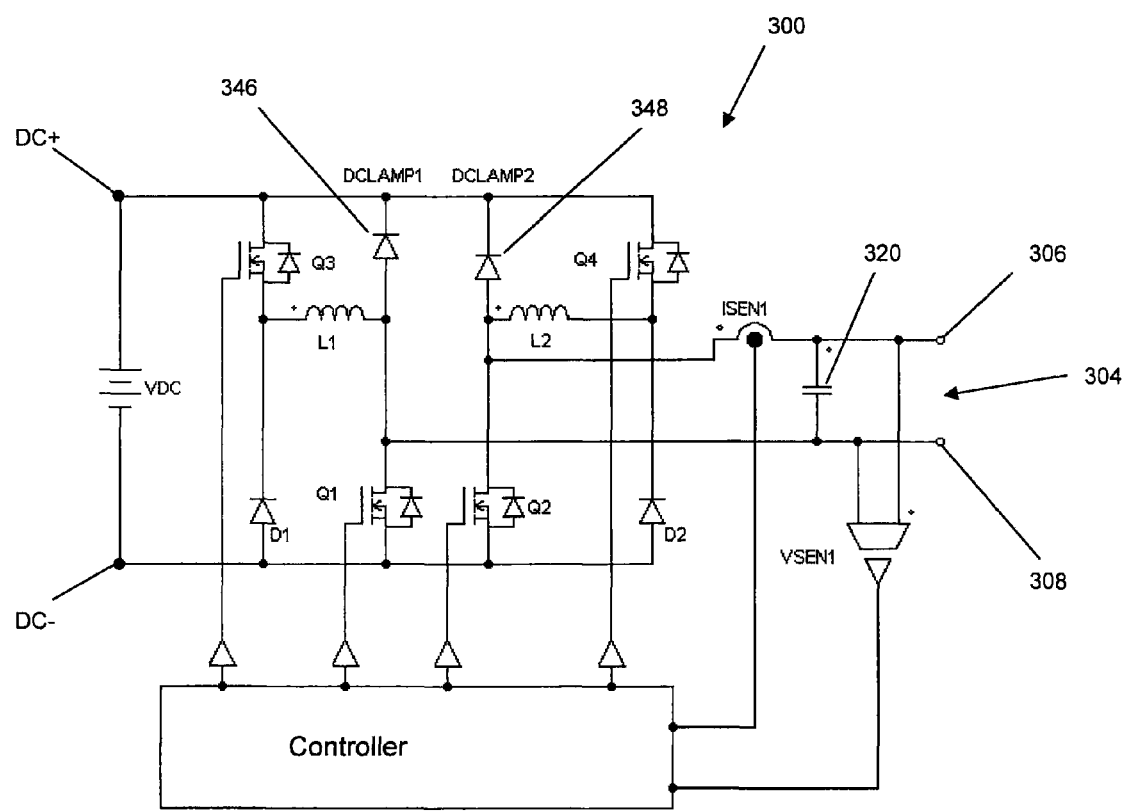
FIG. 19 is a circuit diagram of an example DC-AC inverter including two clamps according to an example embodiment of the present disclosure.

In FIG. 19, another example of a DC-AC inverter 300 capable of performing the method described above is illustrated. The inverter 300 operates in a similar manner and includes similar components as the inverters 100 and 200 discussed above. The inverter 300 converts a DC input from a DC power source VDC to an AC output across first output terminal 306 and second output terminal 308. For example, for a positive half cycle, grounding switch Q1 will remain on (coupling second output terminal 308 to DC−) and power switch Q4, inductor L2 and diode D2 will operate as a buck converter. During a negative half cycle, grounding switch Q2 will be on (coupling first output terminal 306 to DC−) and power switch Q3, inductor L1 and diode D1 will operate as a buck converter. Inverter 300 also includes a first clamp 346 and a second clamp 348. Although in this particular example the first and second clamps 346, 348 are diodes, the first and second clamp 346, 348, may be any suitable clamp circuit, component, etc. The clamps 346, 348 clamp a voltage across an output capacitor 320 to the DC input voltage. The clamping to the input voltage may help avoid occurrence of an overvoltage condition on the output capacitor 320 and avoid damage to grounding switches Q1 and Q2, as discussed below.

Figure 20:
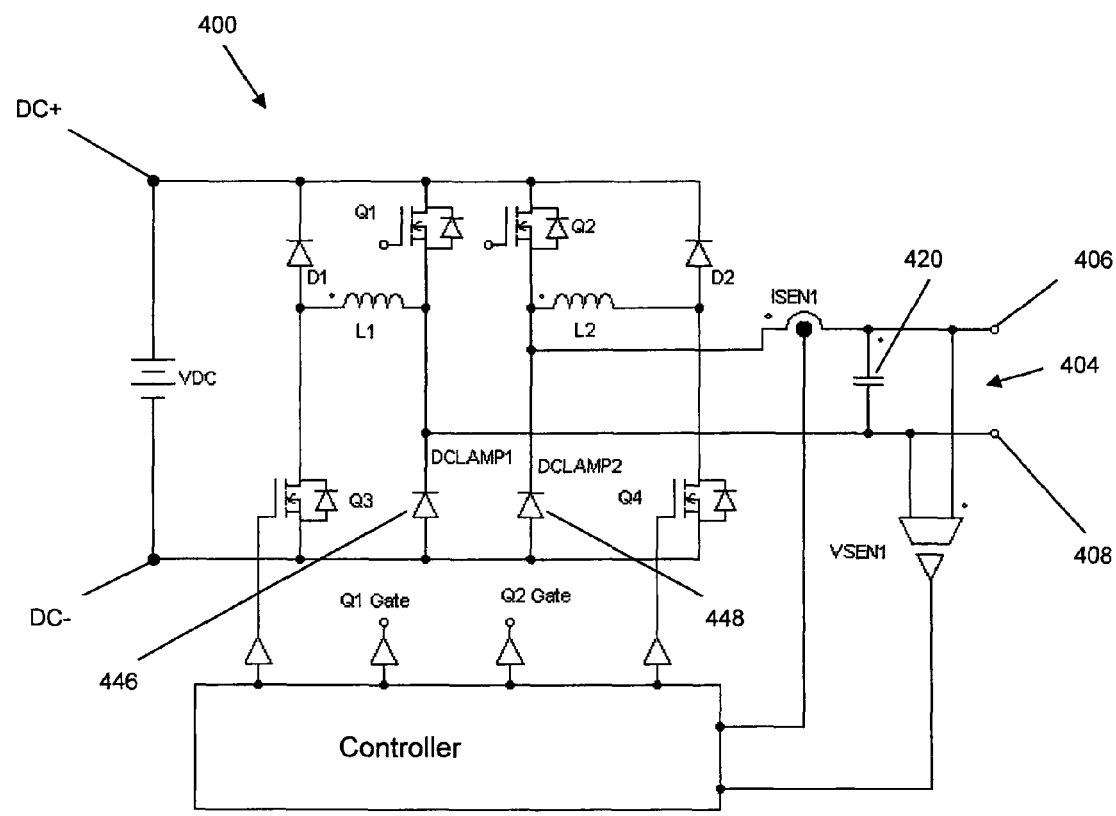
FIG. 20 is a circuit diagram of an example DC-AC inverter including two clamps according to another example embodiment of the present disclosure.

FIG. 20 illustrates yet another example of a DC-AC inverter 400 capable of performing the method described above. The inverter 400 operates in a similar manner and includes similar components as the inverters 100, 200, 300 discussed above. The inverter 400 converts a DC input from a DC power source VDC to an AC output across first output terminal 406 and second output terminal 408. For example, for a positive half cycle, grounding switch Q1 will remain on (coupling second output terminal 408 to DC+) and power switch Q4, inductor L2 and diode D2 will operate as a buck converter. During a negative half cycle, grounding switch Q2 will be on (coupling first output terminal 406 to DC+) and power switch Q3, inductor L1 and diode D1 will operate as a buck converter. Inverter 400 also includes a first clamp 446 and a second clamp 448. Although in this particular example the first and second clamps 446, 448 are diodes, the first and second clamp 446, 448, may be any suitable clamp circuit, component, etc. The clamps 446, 448 clamp a voltage across an output capacitor 420 to the DC input voltage to help avoid occurrence of an overvoltage condition on the output capacitor 420 and avoid damage to grounding switches Q1 and Q2, as discussed below.

Like the inverters 100, 200, the inverters 300, 400 may be used in a grid tied application (i.e., the output 304, 404 is connected to an AC power grid) and may be operated as a current source. In such an application, the inverter 300, 400 is configured to regulate and maintain its output current regardless of the voltage of the grid to which it is tied as long as a peak of the grid voltage does not exceed about ninety-five percent of the DC input voltage. During such operation, energy stored in the inductor L1 or L2 (depending on whether a positive half cycle or a negative half cycle is being produced) equals one half the inductance of L1 or L2 multiplied by the square of the instantaneous value of the output current. When the grid voltage is at or near a peak, the energy stored in the inductor L1 or L2 will be at a maximum and may be quite large. If the inverter is disconnected from the grid at such time (or at any other time when the energy stored in the inductor L1 or L2 is sufficiently large), the energy in the inductor L1 or L2 is transferred to the output capacitor 320, 420. Because such output capacitors are typically small, such a transfer of energy may result in an overvoltage condition. As the voltage across the capacitor 320 or 420 will be applied to grounding switch Q1 or Q2 during its non-conducting state, the switch may get damaged if the voltage exceeds its rated maximum voltage. The clamps 346, 348, 446, 448, however, clamp the voltage on the capacitor 320, 420 and thus clamping the voltage across the grounding switch Q1 and Q2 to the DC input voltage (clamp diode drops neglected) and return excess energy to the DC power source VDC instead of to the capacitor 320, 420. Accordingly, an overvoltage condition on the capacitor 320, 420 and grounding switches Q1 and Q2 is avoided.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A DC-AC inverter for converting a DC power input to an AC power output, the inverter comprising:
   an input for connection to a DC power source;
   an output including a first output terminal and a second output terminal;
   a first buck converter coupled between the input and the output;
   a second buck converter coupled between the input and the output; and a controller for alternately operating the first buck converter and the second buck converter to produce AC power at the output.

2. The inverter of claim 1 wherein the AC power includes alternating positive and negative half cycles, and wherein the controller is configured for operating the first buck converter to produce the positive half cycle and operating the second buck converter to produce the negative half cycle.

3. The inverter of claim 2 wherein the controller is configured to not operate the first buck converter when the second buck converter is operating and to not operate the second buck converter when the first buck converter is operating.

4. The inverter of claim 2 wherein an output of the first buck converter is coupled to the first output terminal and an output of the second buck converter is coupled to the second output terminal.

5. The inverter of claim 4 further comprising a first switch coupled between the first output terminal and a reference voltage terminal and a second switch coupled between the second output terminal and the reference voltage terminal.

6. The inverter of claim 5 wherein the controller is configured to connect the first output terminal to the reference voltage terminal via the first switch when operating the second buck converter and configured to connect the second output terminal to the reference voltage terminal via the second switch when operating the first buck converter.

7. The inverter of claim 6 wherein the input includes DC+ and DC− terminals, and wherein the DC− terminal is the reference voltage terminal.

8. The inverter of claim 6 wherein the input includes DC+ and DC− terminals and wherein the DC− terminal is the reference voltage terminal.

9. The inverter of claim 1 wherein the first buck converter includes an output capacitor shared with the second buck converter.

10. The inverter of claim 9 further comprising a first clamp coupled between the first buck converter and the DC power source and a second clamp coupled between the second buck converter and the DC power source, the first clamp and the second clamp configured to clamp a voltage across the output capacitor to a voltage supplied by the DC power source.

11. A DC-AC inverter comprising:
an input for connection to a DC power source;
an output including a first output terminal and a second output terminal, the output for outputting AC power from the inverter;
a first power switch having a first terminal and a second terminal;
a second power switch having a first terminal and a second terminal;
a first inductor having a first terminal and a second terminal;
a second inductor having a first terminal and a second terminal;
a first grounding switch;
a second grounding switch; and
the first terminal of the first power switch and the first terminal of the second power switch coupled to the input, the second terminal of the first power switch coupled to the first terminal of the first inductor, the second terminal of the second power switch coupled to the first terminal of the second inductor, the second terminal of the first inductor coupled to the first output terminal, the second terminal of the second inductor coupled to the second output terminal, the first grounding switch coupled between the first output terminal and a reference voltage terminal and the second grounding switch coupled between the second output terminal and the reference voltage terminal.

12. The inverter of claim 11 further comprising a first diode coupled between the second terminal of the first power switch and the reference voltage terminal, and a second diode coupled between the second terminal of the second power switch and the reference voltage terminal.

13. The inverter of claim 12 further comprising a controller configured to control the first power switch, the second power switch, the first grounding switch and the second grounding switch to produce AC power at the output.

14. The inverter of claim 13 further comprising a voltage sensor coupled to the controller to provide a signal representing a voltage across the first and second output terminals.

15. The inverter of claim 13 further comprising a current sensor coupled to the controller to provide a signal representing an output current of the inverter.

16. The inverter of claim 12 further comprising an output capacitor coupled between the first and second output terminals.

17. The inverter of claim 16 further comprising a first clamp coupled between the second terminal of the first inductor and the DC power source and a second clamp coupled between the second terminal of the second inductor and the DC power source, the first clamp and the second clamp configured to clamp a voltage across the output capacitor to a voltage supplied by the DC - source.

18. The inverter of claim 11 wherein the input includes DC+ and DC− terminals, and wherein the DC− terminal is the reference voltage terminal.

19. The inverter of claim 11 wherein the input includes DC+ and DC− terminals and wherein the DC− terminal is the reference voltage terminal.

20. A method of operating a DC-AC inverter to produce AC power having alternating positive and negative half cycles, the inverter having an input connected to a DC power source, an output, a first buck converter coupled between the input and the output, and a second buck converter coupled between the input and the output, the method comprising alternately operating the first buck converter and the second buck converter to alternately produce the positive and negative half cycles at the output.

21. The method of claim 20 wherein alternately operating the first buck converter and the second buck converter includes operating the first buck converter when the second buck converter is not operating and operating the second buck converter when the first buck converter is not operating.

22. The method of claim 21 wherein the output includes a first output terminal and a second output terminal, the method further comprising coupling the first output terminal to a reference voltage when operating the second buck converter and coupling the second output terminal to the reference voltage when operating the first buck converter.

23. The method of claim 22 wherein the inverter includes a first grounding switch coupled between the first output terminal and the reference voltage and a second grounding switch coupled between the second output terminal and the reference voltage, wherein coupling the first output terminal to the reference voltage includes coupling the first output terminal to the reference voltage via the first grounding switch, and wherein coupling the second output terminal to the reference voltage includes coupling the second output terminal to the reference voltage via the second grounding switch.

24. The method of claim 23 wherein the input includes DC+ and DC− terminals, wherein the output is coupled to an electric utility grid, and wherein the DC− terminal is the reference voltage.

25. The method of claim 24 wherein the first buck converter includes a first power switch, wherein the second buck converter includes a second power switch, and wherein alternately operating the first buck converter and the second buck converter includes switching the first and second grounding switches at a line frequency of the electric utility grid and switching the first and second power switches at frequencies higher than the line frequency.

26. The method of claim 24 wherein the first buck converter and the second buck converter are alternately operated to produce a substantially constant output current.

27. The method of claim 26 wherein the first buck converter includes an output capacitor shared with the second buck converter, and wherein the inverter includes a first clamp coupled between the first buck converter and the DC power source and a second clamp coupled between the second buck converter and the DC power source, the method further comprising clamping a voltage across the output capacitor to a voltage supplied by the DC power source with the first clamp and the second clamp.

28. The method of claim 23 wherein the input includes DC+ and DC− terminals, wherein the output is coupled to an electric utility grid, and wherein the DC− terminal is the reference voltage.

* * * * *